United States Patent [19]

Davis et al.

[11] Patent Number: 5,072,361

[45] Date of Patent: Dec. 10, 1991

[54] FORCE-REFLECTIVE TELEOPERATION CONTROL SYSTEM

[75] Inventors: Clark C. Davis; Edwin K. Iversen; Stephen C. Jacobsen, all of Salt Lake City; Klaus B. Biggers, Park City, all of Utah

[73] Assignee: Sarcos Group, Salt Lake City, Utah

[21] Appl. No.: 473,575

[22] Filed: Feb. 1, 1990

[51] Int. Cl.$^5$ .......................... G05B 19/18; B25J 3/04
[52] U.S. Cl. .................. 364/167.01; 364/190; 318/568.17; 414/5; 395/83; 395/95
[58] Field of Search .............. 364/167.01, 513, 424.01, 364/559, 132, 190; 414/2, 4, 5, 6, 909; 623/57; 901/23, 45; 318/568.17

[56] References Cited

U.S. PATENT DOCUMENTS

| 3,923,166 | 12/1975 | Fletcher et al. | 901/29 |
| 4,046,262 | 9/1977 | Vykukal et al. | 901/27 |
| 4,302,138 | 11/1981 | Zarudiansky | 414/5 |
| 4,510,574 | 4/1985 | Guittet et al. | 364/513 |
| 4,661,032 | 4/1987 | Arai | 364/513 |
| 4,831,531 | 5/1989 | Adams et al. | 364/424.01 |
| 4,853,874 | 8/1989 | Iwamoto et al. | 364/513 |

Primary Examiner—Jerry Smith
Assistant Examiner—Paul Gordon
Attorney, Agent, or Firm—Thorpe North Western

[57] ABSTRACT

A teleoperation system includes a master station having a manually operable mster link coupled to a master actuator which provides force resistance to operation and movement of the master link, and a slave station having a slave link moveable by a slave actuator in response to command signals. The system also includes a control unit for producing command signals in response to movement of the master link, such control unit having a position transducer for producing signals representing the position of the master link, a force transducer for producing signals representing the force applied to the master actuator by operation of the master link, a second force transducer for producing signals representing force applied to the slave link by the slave actuator, a second position transducer for producing signals representing position of the slave link, and a force controller responsive to the master link position signal, the master actuator force signal, the slave actuator force signal and the slave link position signal for producing a force command signal for supply to the slave actuator to cause the slave actuator to move the slave link in substantially faithful imitation of movement of the master link.

12 Claims, 2 Drawing Sheets

FORCE-REFLECTIVE TELEOPERATION CONTROL SYSTEM

BACKGROUND OF THE INVENTION

This invention relates to a master-slave teleoperation control system in which a slave station responds to command signals from a master station by moving to positions defined by the master station, and the master station, in response to signals from the slave station, reflects forces encountered by the slave station.

A teleoperation control system is a system in which an operator at a master station can manipulate a control element such as an arm, hand, etc., and cause a similarly constructed slave element, such as an arm, hand, etc., located at a remote slave station to move in a certain way. Such systems are useful, for example, in hazardous environments such as in connection with nuclear reactors or other radioactive environments, in space, in deep water, etc. In all such systems, it is generally desirable that movement of the control or master element be exactly reflected in the slave element and that movement of the master element by the operator feel the same as if the operator were directly manipulating the slave element. Since the master element and slave element are typically located remotely from one another, control signals must be sent from the master station to the slave station, for example by radio, and similarly, reaction signals must be sent from the slave station to the master station if the "feel" by the master station of forces encountered at the slave station is to be achieved.

A number of arrangements have been proposed for teleoperation control systems in which feedback loops for position control of the slave element and force reaction of the master element are provided. One such system is disclosed in U.S. Pat. No. 4,661,032 and includes a type of asymmetric configuration substantially as shown FIG. 1. There, a master link element 104, of a master station, shown to be a joy stick, is coupled to an actuator 108, typically a motor or similar device. The position of the master link 104 is detected by a transducer 112 which produces a position signal for supply to a position control servomechanism 116 of a slave station. The force being applied to the master link 104 by the operator is detected by another transducer 120 and a force signal is produced for supply to a force control servomechanism 124 located at the master station.

The prior art asymmetric system FIG. 1 also includes a slave link 128, also a joy stick, coupled to an actuator 132, which typically would be a motor or motors for causing the slave link to move. Both actuators 108 and 132 are mounted on bases 110 and 134 respectively to hold them in place while either reacting to movement of a link or causing a link to move. As at the master station, the position of the slave link 128 and the force supplied to the slave link are detected by transducers 136 and 140 respectively. The transducer 136 supplies a position signal to the position control servomechanism 116 at the slave station and the transducer 140 supplies a force signal to the force control servomechanism 124 located at the master station.

The force control servomechanism 124 compares the force information received from transducers 120 and 140, produces an error signal indicating the difference between the two force information signals, amplifies the error signal and then signals the actuator 108 to cause it to either increase or decrease the force response to movement of the master link 104 to reflect either an increase or decrease respectively of force encountered by the slave link 128. Similarly, the position control servomechanism 116 compares position information signals received from transducers 112 and 136, produces and amplifies an error signal representing the difference between th position information signals, and supplies the amplified error signal to the actuator 132. The actuator 132, in response, causes movement of the slave link 128 to more closely approximate the position of master link 104.

In another prior art system, two force control servomechanisms are provided both at the slave station as well as at the master station, with each receiving one signal from a respective force transducer. The other signal received by both such force control servomechanisms is a position difference signal developed, for example, by a position control servomechanism similar to position control servomechanism 116 of FIG. 1. The outputs of the two force control servomechanisms, in such an arrangement, is then supplied directly to corresponding actuators at the master station and slave station. This type of system is sometimes referred to as a symmetric teleoperation control system.

Among the problems encountered with the asymmetric system is instability resulting when the slave link contacts some object or impedance, i.e., an oscillatory behavior causing reduction in the control capability. In the symmetric system, there tends to be drag or resistance in moving the master element even when the slave element is not in contact with or moving an object. That is, the unloaded operator input impedance is higher than desired. Also, the intersystem (between master and slave) stiffness is not as high as desired so that a springiness or yield is present in the master link even though the slave link may contact an immoveable object.

In general, it is desired that the "feel" at the master link in a teleoperation control system be the same as if there were a direct interaction between the master link and whatever objects or items are being manipulated by the slave link.

SUMMARY OF THE INVENTION

In view of the above-described prior art systems, it is an object of invention to provide an improved master-slave teleoperation control system.

It is also an object of the invention to provide such a system in which unloaded operator input impedance is reduced.

It is a further object of the invention to provide such a system having increased intersystem stiffness.

It is an additional object of the invention to provide such a system in which the frequency components of the forces encountered by the slave link are accurately reflected back to the master link so that a more realistic "feel" is provided in the master link.

The above and other objects of the invention are realized in a specific illustrative embodiment of a teleoperation control system having a master station, which includes a manually operable master link coupled to a master actuator which provides force resistance to operation and movement of the master link, and a slave station, which includes a slave link movable by a slave actuator in response to command signals. The system also includes a master position transducer for producing signals representing position of the master link, a master force transducer for producing signals representing the force supplied to the master actuator by operation of the master link, a slave force transducer for producing signals representing force supplied to the slave link by the slave actuator, and a slave position transducer for producing signals representing position of the slave link. A master position control servo and a slave position control servo each compares the signals produced by the master position transducer and slave position transducer and produce error signals representing the difference between the positions of the master link and slave link. A master force control servo and slave control servo likewise each compares the signals produced by the master force transducer and the slave force transducer to produce error signals representing the difference in force applied by the master link to the master actuator and the force supplied by the slave actuator to the slave link. A master summing circuit sums the error signals from the master position control servo and master force control servo to produce a command signal for supply to the master actuator. The master actuator, in turn, reacts or presents a resistance to movement of the master link to more faithfully reflect the resistance encountered by the slave link. A slave summing circuit likewise sums the error signals produced by the slave position control servo and slave force control servo to produce a command signal which is supplied to the slave actuator to cause the slave link to move in a more faithful imitation of movement of the master link.

With the system described, the slave link is caused to move in a fashion closely imitating movement of the master link, and the master link, "feels" more accurately the forces encountered by the slave link.

Although the illustrative embodiment described above at least intimates operation of the master link by a human operator, it should be recognized that the master link could also be operated or manipulated by a robot, another slave station, or a variety of non-human operators.

BRIEF DESCRIPTION OF THE DRAWINGS

The above and other objects, features and advantages of invention will become apparent from a consideration of the following detailed description presented in connection with the accompanying drawings in which.

DETAILED DESCRIPTION

Figure 1:
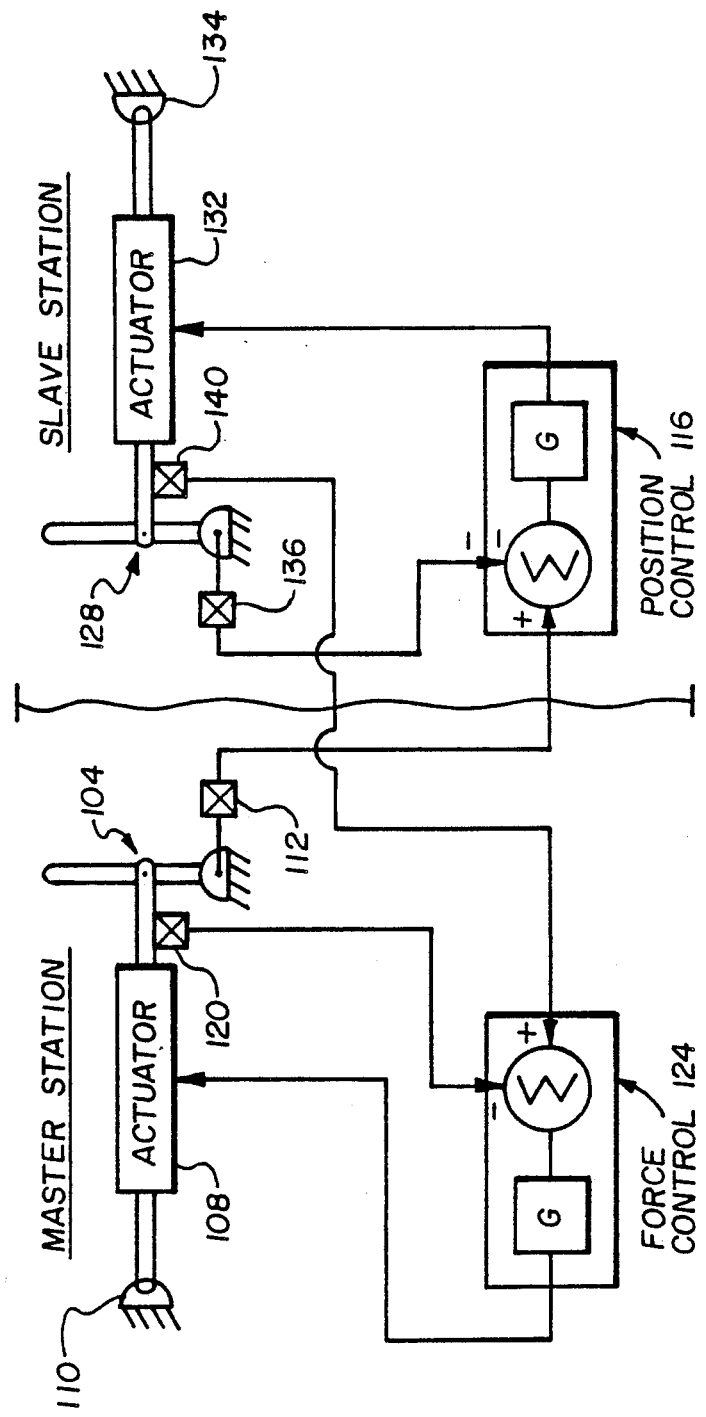
FIG. 1 shows a schematic drawing of a prior art teleoperation control system, already described.
Figure 2:
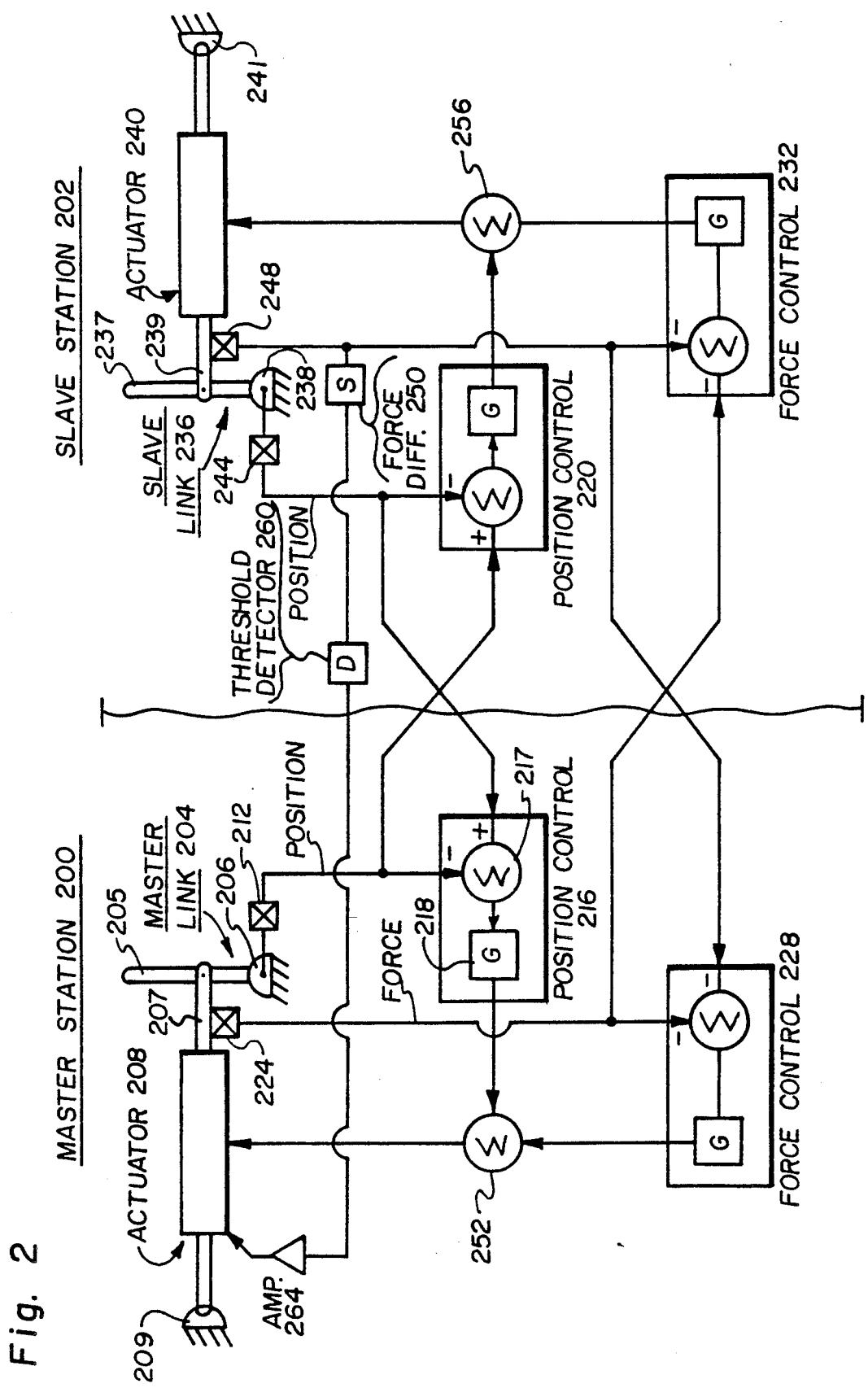
FIG. 2 shows a schematic drawing of a force-reflective teleoperation control system made in accordance with the principles of the present invention.

Referring to FIG. 2 which shows a schematic of one illustrative embodiment of the present invention, a master station 200 and slave station 202 are shown by which an operator (could be a human operator, machine or robot operator, environmental operator, etc.) at the master station may effectuate movement at the slave station. The master station 200 includes a master link 204 shown to be a pivotally mounted joy stick, but which could be any type of manipulable element such as a slidable element, rotatable element, robotic arm, robotic hand, etc. The master link 204 includes a generally vertically disposed arm 205 pivotally mounted in a base 206. The arm 205 is coupled by way of a connecting link 207 to an actuator 208 which, in turn, is mounted to a stationary base 209. The actuator 208 could be a motor, piston, or similar device to provide reflected forces or "feel" to the master link 204.

Shown schematically coupled to the base 206 of the master link 204 is a position transducer 212 which detects the position of the master link 204 and in particular the position of the arm 205, and develops a position signal representing this position. This signal is supplied to a position servocontrol mechanism 216 which is part of the master station 200, and to a position servocontrol mechanism 220 which is part of the slave station 202. The position transducer 212 is a common element and could consist of a potentiometer, or rotary variable differential transformer whose output voltage indicates the position of the arm 205. The position servocontrol mechanisms 216 and 220, each includes a summing circuit, such as circuit 217 of position servocontrol mechanism 216, and a gain circuit, such as gain circuit 218.

The force being exerted by manipulation of the arm 205 against the connecting arm 207 (by an operator) is detected by a force transducer 224 which produces a force signal representing the force applied by the master link 204 to the actuator 208. For example, the force transducer 224 might illustratively be a type of electronic weight scale for producing an output voltage whose value is proportional to the force applied by the master link. The force signal is supplied to a force servocontrol mechanism 228 of the master station 200 and also to a force servocontrol mechanism 232 of the slave station 202. The force servocontrol mechanisms 228 and 232 include components similar to those of the position servocontrol mechanisms 216 and 220.

The control system of FIG. 2 also includes a slave link 236 at the slave station 202, with the slave link including a generally vertical arm 237 pivotally mounted to a stationary base 238. A connecting arm 239 connects the arm 237 to an actuator 240 which, again, could be a motor, piston, or similar device for causing the arm 237 to move. The actuator 240 is mounted to a stationary base 241. A position transducer 244 is coupled to the slave link 236 to detect the position of the arm 237 and to produce a position signal representing this position which signal is then supplied to the position servocontrol mechanism 220 and to the position servocontrol mechanism 216. A force transducer 248 detects the force applied by the actuator 240 to the arm 237 and provides a force signal, representing the detected force, to th force servocontrol mechanism 232 and to the force servocontrol mechanism 228. The force signal is also supplied to a force differentiator 250.

Each of the servocontrol devices 216, 220, 228 and 232 compares the two signals received (either position information or force information) to produce an error signal indicating the difference between the two compared parameters. For example, the position servocontrol mechanism 216 compares the position signal indicating the position of the master link 204 with the position signal indicating the position of slave link 236 to produce an error signal indicating the difference in position between the two links. This error signal is then supplied to gain circuit 218 which amplifies the signal and supplies it to a summing circuit 252. The force servocontrol mechanism 228 in a similar fashion compares the force signal representing the force supplied by the master link 204 to the actuator 208 with the force signal representing the force applied by the actuator 240 to the slave link 236 to produce an error signal which is amplified and then supplied also to the summing circuit 252. The summing circuit 252 adds the two error signals to produce a command signal for actuator 208 to cause the actuator to react in a certain way to movement of the master link 204. For example, if movement of the master link 204 caused the slave link 236 to encounter some resistance, then the resistance presented by the actuator 208 to the master link 204 would be increased to match the resistance encountered by the slave link.

The error signals produced by the position servocontrol mechanism 220 and by the force servocontrol mechanism 232 are likewise supplied to a summing circuit 256 where they are added to produce a command signal for application to the actuator 240. The actuator 240 responds to the command signal to cause movement of the slave link 236 as directed by the command signal. For example, if the master link 204 has been moved a certain distance, then the command signal produced by the summing circuit 256 would have caused the actuator 240 to similarly move the slave link 236 the same distance.

With the system of FIG. 2, the master link 204 is able to more precisely and directly control the movement of slave link 236 and the "feel" by the operator or manipulator of the master link 204 is more accurately reflected from the slave link to the master link. That is, resistance encountered by the slave link is felt at the master link and any movement of the master link causes a substantially similar movement at the slave link. This results in increased intersystem stiffness (master link stops when slave link is stopped by contacting an immoveable object, without substantial give or "springiness"), unloaded operator input impedance is reduced (little drag or resistance in moving the master link is encountered when the slave link is not in contact with or moving another object so that the "feel" at the master link is of free movement), and the frequency components of forces applied to the slave link are accurately reflected or fed back to the master link.

Another feature of the system of the present invention might be referred to as "tap response" and is provided to enable an operator or manipulator of the master link to sense more accurately the point at which the slave link makes contact with an object. This feature involves the force differentiator 250 which determines the rate of change of force detected by the force transducer 248. When this rate of change exceeds a certain level (indicating an abrupt resistance encountered by the slave link 236), a threshold detector 260 produces a pulse signal for application to an amplifier 264 and the amplified signal is then supplied to the actuator 208 to cause the actuator to apply an abrupt force (a sharp, short, pulse of force) to the master link 204. This force is only of short duration to provide a "tap" feel to the operator of the master link so that he, she or it will recognize that the slave link 236 has contacted an object. This feature enhances the accuracy of the "feel" at the master link 204 of resistance encountered by the slave link 236.

The FIG. 2 embodiment of the invention is shown with the master station 200 and slave station 202 each having its own position servocontrol mechanism and force servocontrol mechanism; however, a single position servocontrol mechanism, such as mechanism 216, and single force servocontrol mechanism, such as mechanism 228, could perform the needed formations for both the master station and slave station. For example, position servocontrol mechanism 220 could be eliminated and the output of the gain circuit 218 supplied to summing circuit 256 as well as to summing circuit 252. Likewise, force servocontrol mechanism 232 could be eliminated and the output of the gain circuit of the force servocontrol mechanism 228 supplied to summing circuit 256. Of course, with the elimination of the mechanisms 220 and 232, inputs to those mechanisms would also be eliminated. Otherwise, the operation of the system is the same as described for the FIG. 2 embodiment.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. In a teleoperation system having a master station, which includes an operable master link coupled to a master actuator which provides force resistance to operation and movement of the master link in response to command signals, and a slave station, which includes a slave link moveable by a slave actuator in response to command signals, a control system for producing command signals in response to movement of the master link comprising:
    means for producing a signal representing position of the master link;
    means for producing a signal representing force applied to the master actuator by operation of the master link;
    means for producing a signal representing force applied to the slave link by the slave actuator;
    means for producing a signal representing position of the slave link; and
    first force control means responsive to the master link position signal, the master actuator force signal, the slave actuator force signal, and the slave link position signal for producing a first force command signal for supply to the slave actuator to cause the slave actuator to move the slave link in substantially faithful imitation of movement of the master link.

2. A control system as in claim 1 further including second force control means responsive to the master link position signal, the master actuator force signal, the slave actuator force signal, and the slave link position signal for producing a second force command signal for supply to the master actuator to cause the master actuator to resist movement of the master link in substantially faithful imitation of the force resistance encountered by the slave link.

3. A control system as in claim 2 wherein said first force control means and said second force control means each comprises means for producing a signal indicative of the sum of differences between the position of the slave link and the position of the master link, and between the force supplied by the slave actuator to the slave link and the force encountered by the master link from the master actuator.

4. A control system as in claim 3 wherein said first force control means comprises
    a slave position servocontrol mechanism for producing a first position difference signal representing the difference between the position of the slave link and that of the master link, and for amplifying the first position difference signal;
    a slave force servocontrol mechanism for producing a first force difference signal representing the difference between the force supplied by the slave actuator to the slave link and the force encountered by the master link from the master actuator, and for amplifying the first force difference signal; and first summing means for summing the first position difference signal and the first force difference signal to produce the first force command signal.

5. A control system as in claim 4 wherein said second force control means comprises:
- a master position servocontrol mechanism for producing a second position difference signal representing the difference between the position of the master link and that of the slave link, and for amplifying the second position difference signal;
- a master force servocontrol mechanism for producing a second force difference signal representing the difference between the force encountered by the master link from the master actuator and the force supplied by the slave actuator to the slave link, and for amplifying the second force position difference signal, and
- second summing means for summing the second position difference signal and the second force difference signal to produce the second force command signal.

6. A control system as in claim 5 further comprising differentiation means for producing a signal representing the rate of change of the slave actuator force signal, and threshold means for supplying a threshold signal to the master actuator to cause it to momentarily apply a force to the master link when the rate of change signal exceeds a certain threshold level.

7. A control system as in claim 6 wherein said threshold signal comprise a short-duration pulse signal supplied to the master actuator.

8. A control system as in claim 1 further including means for supplying the first force command signal to the master actuator to cause the master actuator to resist movement of the master link in substantially faithful imitation of the force resistance encountered by the slave link.

9. A control system as in claim 8 wherein said first force control means comprises
- a position servocontrol circuit responsive to the master link position signal and the slave link position signal for producing a position difference signal representing the difference between the position of the master link and the position of the slave link,
- a force servocontrol circuit response to the master actuator force signal and the slave actuator force signal for producing a force difference signal representing the difference between the force encountered by the master link from the master actuator, and the force supplied by the slave actuator to the slave link, and
- a summing circuit for summing the position difference signal and the slave difference signal to produce the first force command signal.

10. A control system as in claim 9 further comprising differentiation means for producing a signal representing the rate of change of the slave actuator force signal, and threshold means for supplying a threshold signal to the master actuator when the rate of change signal exceeds a predetermined threshold level, and wherein said master actuator is adapted to abruptly increase the resistance to movement of the master link in response to the threshold signal.

11. A control system as in claim 10 wherein said threshold means comprises means for producing a high frequency signal pulse for application to the master actuator to cause it to briefly increase the resistance to movement of the master link.

12. A teleoperation control system comprising
- a master station including
  - a manually moveable master element,
  - a master actuator means coupled to the master element for presenting a force resistance to movement of the master element in response to a master command signal,
  - master position transducer means for producing a master position signal representing position of the master element, and
  - master force transducer means for producing a master force signal representing force applied to the master actuator means by the master element when the master element is moved, and
- a slave station including
  - a moveable slave element,
  - a slave actuator means coupled to the slave element and responsive to a slave command signal for causing the slave element to move,
  - slave position transducer means for producing a slave position signal representing position of the slave element, and
  - slave force transducer means for producing a slave force signal representing force applied by the slave actuator means to the slave element,
- said master station further including
  - master position control means responsive to the master position signal and slave position signal for producing a first error signal representing the difference in position of the master element and slave element,
  - master force control means responsive to the master force signal and slave force signal for producing a second error signal representing the difference in force applied by the master element to the master actuator and force applied by the slave actuator to the slave element, and
  - master summing means for adding the first and second error signals to produce a master command signal for application to the master actuator to cause the master actuator to vary the force resistance to movement of the master element in accordance with the value of the master command signal, and
- said slave station further including
  - slave position control means responsive to the master position signal and slave position signal for producing a third error signal representing the difference in the position of the master element and slave element,
  - slave force control means response to the master force signal and slave force signal for producing a fourth error signal representing the difference in force supplied by the master element to the master actuator and force supplied by the slave actuator to the slave element, and
  - slave summing means for adding the third and fourth error signals to produce a slave command signal for application to the slave actuator to cause the slave actuator to move the slave element in accordance with the value of the slave command signal.

* * * * *